Oct. 3, 1933.  F. H. OWENS  1,929,119

SOUND REPRODUCING APPARATUS

Filed June 25, 1930

INVENTOR.
FREEMAN H. OWENS.
BY
ATTORNEY.

Patented Oct. 3, 1933

1,929,119

UNITED STATES PATENT OFFICE 1,929,119

SOUND REPRODUCING APPARATUS

Freeman H. Owens, New York, N. Y.

Application June 25, 1930. Serial No. 463,663

3 Claims. (Cl. 179—100.3)

My invention relates to a sound film apparatus and particularly to a means for adjusting or shifting the sound unit for a photographic film sound record.

In the recording and reproduction of sound photographically, it may occur that a plurality of sound tracks or records are provided on a single length of film, such records being disposed side by side in parallel and contiguous relation. The film may be an endless band or it may be a single length which when run through the apparatus in one direction for the amount of its length, is reversed and wound in the opposite direction. In the latter event, the adjacent sound records would of course run in opposite directions for reproduction. If the film is endless, the records would all run in one direction for reproduction.

In reproducing the records or sound tracks from a film of this character, it is necessary of course, that one record or track be exposed to the source of light and optical system at a time, and that means be provided for shifting from one record to the next or to another selected one, as soon as one has been completely reproduced.

I have provided a novel simple and effective means for manually shifting or adjusting the reproducing units with respect to the film whereby to select any one of a plurality of sound records on the film for reproduction.

I have also provided an indicating means whereby the operator may make his selection of records to be reproduced.

Another object of the invention lies in the provision of a locking means for the shiftable sound unit.

It will be understood of course, that this device is operative and effective whether the adjacent sound records form a continuous single selection or whether each sound track comprises a complete and independent record in itself.

It will also be understood that the invention herein applies equally well to recording as well as reproducing photographic sound records.

Referring to the drawing forming a part of this application and wherein like reference numerals indicate like parts:—

Figure 1:
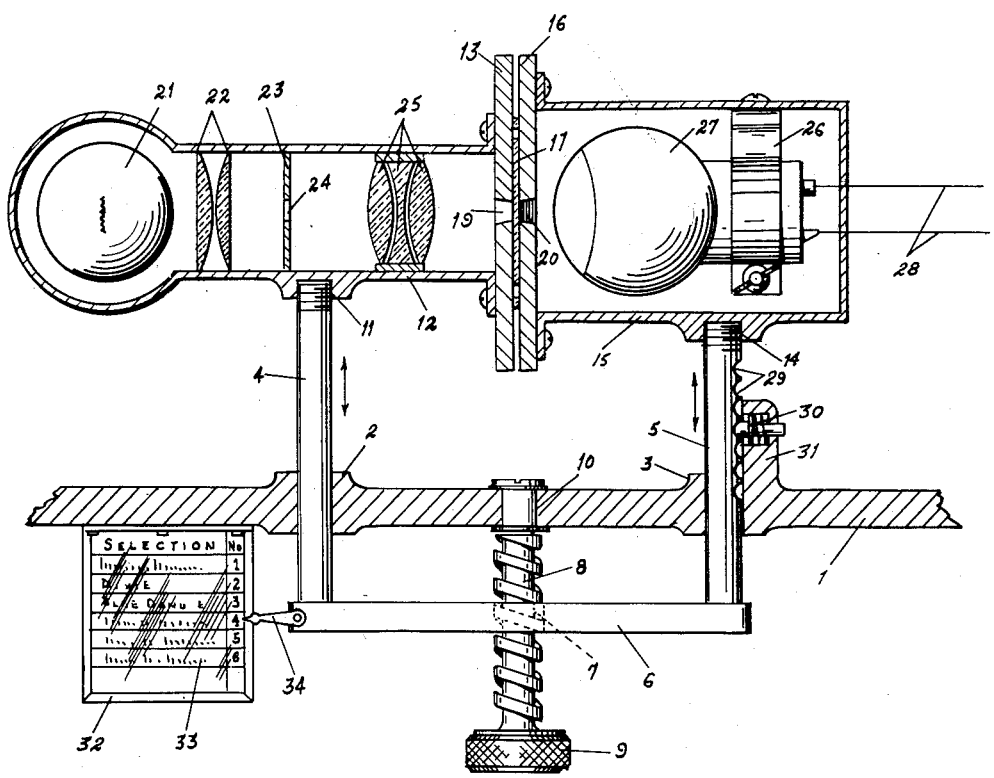
Figure 1 is a top sectional plan view of an apparatus embodying my invention.
Figure 2:
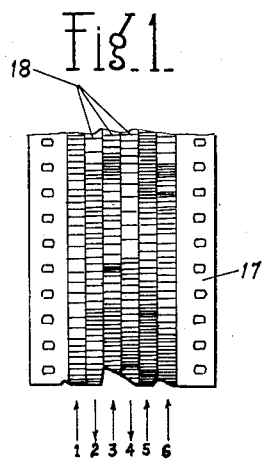
Figure 2 is a detail view of a portion of a photographic film bearing a plurality of sound records such as may be reproduced in my apparatus.

The reference numeral 1 indicates a supporting wall provided with spaced bearings 2 and 3 through which are slidable the supporting pins 4 and 5. The pins 4 and 5 are connected at one end by a cross bar or frame member 6 provided centrally with a threaded opening 7 to receive the screw 8, the outer end of which is provided with a finger piece 9 and the inner end of which is rotatably journaled as at 10 in the wall 1. Obviously upon rotating the screw 8, the frame member 6 and the pins 4 and 5 will be moved laterally with respect to the supporting wall 1.

The pin carries at its inner end, as by screw threaded connection 11, a housing 12, one end of which is provided with one portion 13 of a film gate. The pin 5 carries at its inner end as by the threaded connection 14, a housing 15 carrying at one of its ends the film gate portion 16 complementary to and spaced from the portion 13, thus provided a film guide or gate through which may pass the film 17 bearing a plurality of photographic sound records or tracks 18. The gate members 13 and 16 are provided with aligned openings 19 and 20 past which one of the sound tracks 18 is adapted to pass during movement of the film 17 through the apparatus by any suitable or desirable film moving mechanism.

The housing 13 is provided with a source of illumination such as the lamp 21, condenser lenses 22, a partition 23 provided with a narrow slit 24, and a focusing lens 25. The lens 25 is adapted to focus the illuminated aerial image of the slit 24 upon the sound record 18 which is in alignment with the openings 19 and 20 whereby to illuminate such sound record. The housing 15 has suitably supported therein, as by the clamp 26, a photo electric cell 27 which has suitable connection through the wires 28 with any desired type of amplifier and loud speaker. Obviously, therefore, the light rays from the lamp 21 modulated by sound record 18 passing the openings 19 and 20 in the gate members 13 and 16, will be caught by the photo electric cell whereby the sound record may be translated and rendered audible. It will be clear that by rotating the screw 8, the reproducing apparatus consisting of the housings 12 and 15 and the parts therein, will be maintained in proper alignment and shifted or adjusted laterally with respect to the film 17, whereby to bring any of the sound records 18 which may be desired, into reproducing position.

The pin 5 may be provided in one side with a series of depressions 29 adapted to receive a spring pressed plunger or friction locking device 30 carried by an extension 31 of the bearing 3. By this means, the reproducing unit may be suitably frictionally locked in each of its adjusted positions.

Suitably secured upon the wall 1 is provided a frame 32 adapted to receive a program card or other indicating device 33 upon which may be listed the particular records or selections on the film being reproduced in the apparatus. A pointer 34 is carried by the frame member 6 and cooperates with the program card whereby the operator may see at a glance what record is being reproduced and may by this visual indicating means promptly select any desired record for reproduction.

Of course, changes may be made in details of construction and arrangement of parts without departing from the spirit and scope of my invention. I do not limit myself, therefore, to the exact form herein shown and described other than by the appended claims.

I claim:

1. Reproducing apparatus for a sound film bearing a plurality of adjacent sound records comprising two separate housings forming a gate through which the film passes between said housings, said housings having aligned openings for uncovering a selected record on said film, an adjustable support for said housings, and means for manually shifting said support with respect to said film for selectively uncovering any one of the sound records on the film.

2. Reproducing apparatus for a sound film bearing a plurality of adjacent sound records comprising two separate housings forming a gate through which the film passes between said housings, said housings having aligned openings for uncovering a selected record on said film, an adjustable support for said housings, and means for manually shifting said support with respect to said film for selectively uncovering any one of the sound records on the film, and means for passing the illuminated aerial image of a narrow slit through the selected sound record to a photo electric cell, said cell being mounted in one of said housings.

3. Reproducing apparatus for a sound film bearing a plurality of adjacent sound records comprising two separate housings forming a gate through which the film passes between said housings, said housings having aligned openings for uncovering a selected record on said film, an adjustable support for said housings, and means for manually shifting said support with respect to said film for selectively uncovering any one of the sound records on the film, and means for passing the illuminated aerial image of a narrow slit through the selected sound record to a photo electric cell, said means and cell being shiftable with said housings.

FREEMAN H. OWENS.